United States Patent
Sutardja

(10) Patent No.: US 8,341,447 B2
(45) Date of Patent: Dec. 25, 2012

(54) COMPUTER WITH LOW-POWER SECONDARY PROCESSOR AND SECONDARY DISPLAY

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/437,490

(22) Filed: Apr. 2, 2012

(65) Prior Publication Data

US 2012/0192001 A1 Jul. 26, 2012

Related U.S. Application Data

(63) Continuation of application No. 12/229,034, filed on Aug. 19, 2008, now Pat. No. 8,151,129, which is a continuation of application No. 10/779,544, filed on Feb. 13, 2004, now Pat. No. 7,421,602.

(51) Int. Cl.
*G06F 1/32* (2006.01)

(52) U.S. Cl. ........................ 713/324; 713/300; 713/323

(58) Field of Classification Search ........................ None
See application file for complete search history.

(56) References Cited

U.S. PATENT DOCUMENTS

| | | | |
|---|---|---|---|
| 5,768,164 A | 6/1998 | Hollon, Jr. | |
| 7,421,602 B2* | 9/2008 | Sutardja | 713/324 |
| 7,428,650 B2 | 9/2008 | Kardach et al. | |
| 8,151,129 B2* | 4/2012 | Sutardja | 713/324 |
| 2002/0086719 A1 | 7/2002 | Kedia et al. | |
| 2002/0103951 A1 | 8/2002 | Huber et al. | |
| 2002/0129288 A1 | 9/2002 | Loh et al. | |
| 2003/0100963 A1 | 5/2003 | Potts et al. | |
| 2003/0135771 A1 | 7/2003 | Cupps et al. | |
| 2003/0188077 A1 | 10/2003 | Watts et al. | |
| 2003/0191972 A1 | 10/2003 | Watts, Jr. | |
| 2004/0225901 A1 | 11/2004 | Bear et al. | |
| 2005/0064911 A1 | 3/2005 | Chen et al. | |

(Continued)

FOREIGN PATENT DOCUMENTS

CN 1550951 12/2004

(Continued)

OTHER PUBLICATIONS

ANSI/IEEE Std. 802.11, 1999 Edition; Part 11: Wireless LAN Medium Access Cntrol (MAC) and Physical Layer (PHY) Specifications; Information technology—Telecommunications and information exchange between systems—Local and metropolitan area networks—Specific requirements; pp. 1-512.

(Continued)

*Primary Examiner* — Dennis M Butler

(57) ABSTRACT

A device operable in each of active and inactive modes includes first and second processors. The first processor performs, in accordance with a first power level, both wireless and non-wireless network processing. A second processor performs wireless network processing in accordance with a second power level. While the device is operating in the active mode: the first processor and the first display are powered up; the first display displays a result of the wireless network processing or the non-wireless network processing by the first processor; and the second processor and the second display are powered down. While the device is operating in the inactive mode: the first processor and the first display are powered down; the second processor and the second display are powered up; and the second display displays a result of the wireless network related processing by the second processor.

19 Claims, 11 Drawing Sheets

U.S. PATENT DOCUMENTS

| | | | |
|---|---|---|---|
| 2005/0066209 | A1 | 3/2005 | Kee et al. |
| 2006/0007051 | A1 | 1/2006 | Bear et al. |
| 2006/0129861 | A1 | 6/2006 | Kee et al. |

FOREIGN PATENT DOCUMENTS

| | | |
|---|---|---|
| EP | 0 667 579 A1 | 8/1995 |
| JP | 11086433 | 3/1999 |
| JP | 2002-007373 | 11/2002 |
| JP | 2002-073497 | 12/2002 |
| JP | 2003523571 | 8/2003 |
| JP | 2003-167656 | 11/2003 |
| JP | 2003-323417 | 11/2003 |
| TW | 451123 | 8/2001 |
| TW | 552499 | 9/2003 |
| WO | WO 02/100117 | 12/2002 |
| WO | WO 03/029943 | 4/2003 |
| WO | WO 03/083694 | 10/2003 |

OTHER PUBLICATIONS

Communication dated Apr. 26, 2010 for Application No. JP 2005-144894 with Non-Final Notice of Reasons for Re'ection dated Apr. 20, 2010; 10 pages.

Communication dated Apr. 30, 2010 for Application No. JP 2005-209263 with Non-Final Notice of Reasons for Re'ection dated Apr. 27, 2010; 8 pages.

Communication dated Apr. 30, 2010 for Application No. JP 2005-209264 with Non-Final Notice of Reasons for Re'ection dated Apr. 27, 2010; 6 pages.

Communication dated Jun. 22, 2011 for Taiwanese Patent Application No. 094101598 with First Office Action issued May 27, 2011; 13 pages.

Communication dated Aug. 3, 2011 for Japanese Patent Application No. 2005-033647 enclosing Examiner's Report to the Board; 6 pages.

Dean Takahashi; "PortaiPiayer Takes a Leap", The Mercury News, Mar. 14, 2006, 3 pages.

European Search Report dated Feb. 19, 2010 for European Patent Application No. 05 002 059.3 with corres ondence of Mar. 2, 2010; 5 pages.

IEEE P802.11 g/D8.2 Apr. 2003 (Supplement to ANSI/IEEE std. 802.11 1999(Reaff 2003) Draft Supplement Standard for Part 11: Wireless LAN Medium Access Cntrol (MAC) and Physical Layer (PHY) Specifications; Information technology—Telecommunications and information exchange between systems—Local and metropolitan area networks—Specific requirements; Further Higher Data Rate Extension in the 2.4 GHz Band; pp. 1-69.

IEEE Std. 802.11 a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-83.

IEEE Std. 802.11 b; Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications: Higher-Speed Physical Layer Extension in the 2.4 GHz Band; Approved Sep. 16, 1999; pp. 1-89.

IEEE Std. 802.11 b-1999/Cor Jan. 2001 ;IEEE Standard for Information technology—Telecommunications and information exchange between systems—Local and metropolitan area networks—Specific requirements; Part 11: Wireless LAN Medium Access Cntrol (MAC) and Physical Layer (PHY) Specifications; Amendment 2: Higher-speed Physical Layer (PHY) extension in the 2.4 GHz band—Corrigendum 1; pp. 1-15.

IEEE Std. 802.16; IEEE Standard for Local and metropolitan area networks; Part 16: Air Interface for Fixed Broadband Wireless Access Systems; Apr. 8, 2002; pp. 1-322.

IEEE Std. 802.16a; IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; Apr. 1, 2003; pp. 1-292.

Notification of First Office Action from the State Intellectual Property Office of PRC dated Aug. 24, 2007 for Chinese Application No. 200510007529.7; 14 pages.

\* cited by examiner

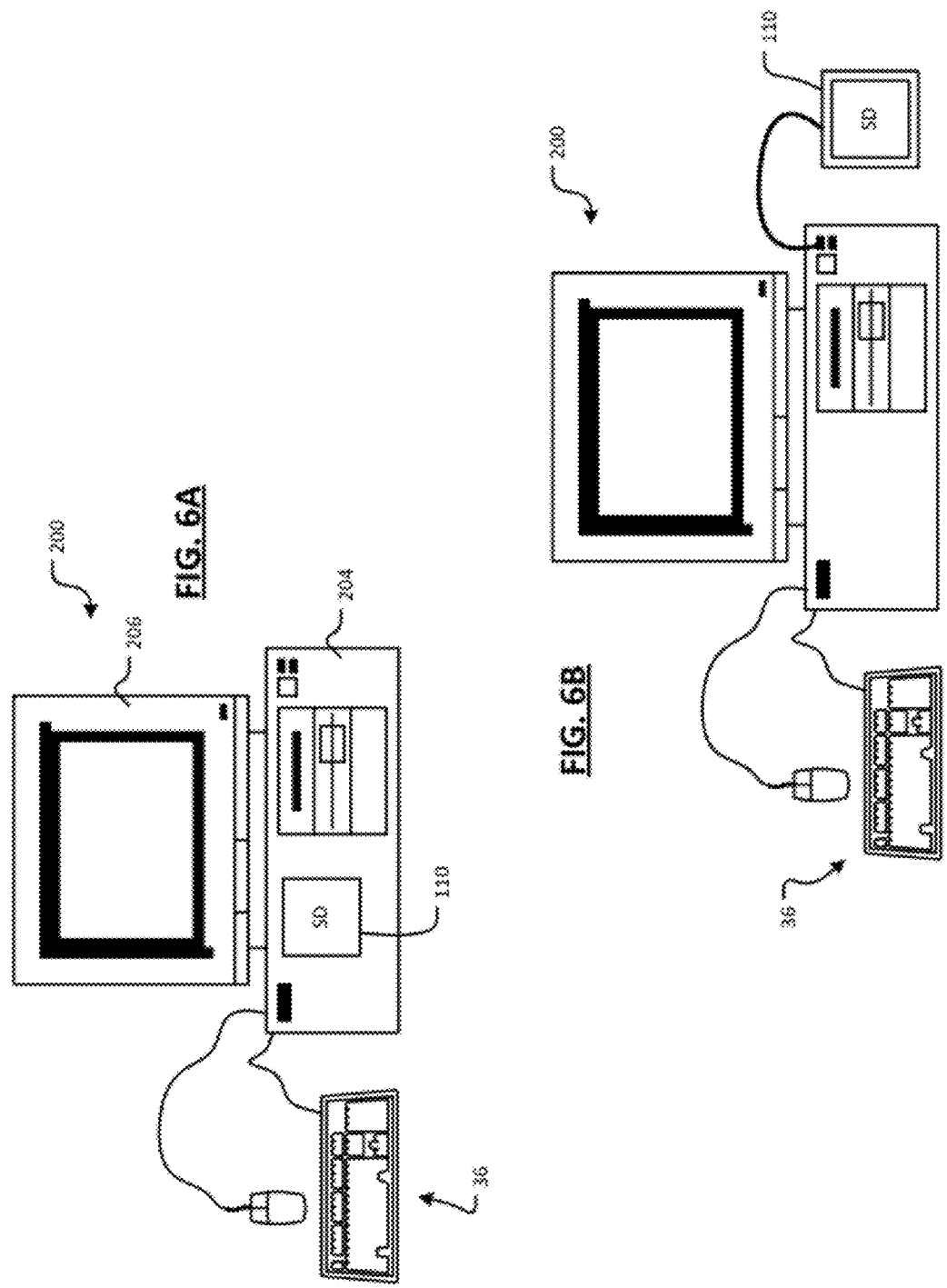

COMPUTER WITH LOW-POWER SECONDARY PROCESSOR AND SECONDARY DISPLAY

CROSS-REFERENCE TO RELATED APPLICATIONS

This application is a continuation of U.S. patent application Ser. No. 12/229,034 filed on Aug. 19, 2008, which is a continuation of U.S. patent application Ser. No. 10/779,544, filed Feb. 13, 2004. The disclosures of the above applications are incorporated herein by reference in their entirety.

FIELD

The present disclosure relates to laptop and desktop computer architectures, and more particularly to laptop and desktop computer architectures having low-power secondary processors and secondary displays for providing reduced functionality when the laptop and desktop computers are in an inactive mode.

BACKGROUND

Referring now to FIG. 1, a typical computer architecture for a laptop or desktop computer 10 is shown. The computer 10 includes an input/output (I/O) interface 12 that communicates with one or more peripheral devices 13. The memory 16 stores data and includes random access memory (RAM), read-only memory (ROM), Flash memory, and/or any other type of electronic data storage. The memory 16 communicates with a processor, memory and graphics hub 18. The hub 18, in turn, communicates with the I/O interface 12. A processor 20 also communicates with the processor, memory and graphics hub 18 and performs data processing, calculations, and other tasks. A graphics card and/or chip 24 may be provided to accelerate graphics processing. In some implementations, the processor, memory and graphics hub 18 and/or the graphics card and/or chip 24 are omitted and/or are integrated with other components.

The computer 10 further includes a display 30, which is typically a color display. A disk drive system 34 typically includes a magnetic storage medium that stores data. The disk drive system 34 may include a hard disk controller (HDC), an embedded processor, and/or other components (not shown). One or more input/output (I/O) devices 36 such as a keyboard, a mouse, a touch pad, a scratch pad and/or other pointing and/or input devices facilitate data input, navigation and/or user interaction with the computer. A wireless network interface 38 enables wireless connectivity with a wireless network such as a wide area network, a local area network, a cellular network such as CDMA, GSM, GSM3G, GPRS systems or other cellular networks, a Bluetooth network, or any other wireless network type. For example, the wireless network interface 38 may be compliant with IEEE Section 802.11, 802.11a, 802.11b, 802.11g, and/or 802.16.

Referring now to FIG. 2, when a laptop user travels with a laptop 50, the laptop 50 may pass through hot zones 54-1 and 54-2 (collectively hot zones 54). Access points 56-1 and 56-2 (collectively access points 56) provide wireless network connectivity to a distributed communications system 58 such as the Internet in the hot zones 54-1 and 54-2, respectively. Similarly, a home zone 60 may include an access point 62 that also provides wireless access to the distributed communication system 58.

Unless the laptop 50 is turned on and booted up, the user is not able to determine whether he or she has entered a hot zone 54. As can be appreciated, booting up the laptop 50 to determine whether a hot zone 54 is available is a time-consuming process. Likewise, when the laptop user wants to check e-mail, to check securities quotes, to trade securities and/or to use other Internet services, the laptop user must boot up the laptop 50.

SUMMARY

A device operable in each of an active mode and an inactive mode is provided. The device includes a first processor configured to perform, in accordance with a first power level, both wireless network related processing and non-wireless network related processing. A second processor is configured to perform wireless network related processing in accordance with a second power level. The second power level is lower than the first power level. A first display is in communication with the first processor. A second display is in communication with the second processor. While the device is operating in the active mode, i) each of the first processor and the first display is powered up, ii) the first display is configured to display a result of the wireless network related processing by the first processor or a result of the non-wireless network related processing by the first processor, and iii) each of the second processor and the second display is powered down. While the device is operating in the inactive mode, i) each of the first processor and the first display is powered down, ii) each of the second processor and the second display is powered up, and iii) the second display is configured to display a result of the wireless network related processing by the second processor.

A method of operating a device in an active mode and an inactive mode is provided. The device includes i) a first processor, ii) a second processor, iii) a first display in communication with the first processor, and iv) a second display in communication with the second processor. The method includes, while the device is operating in the active mode, i) operating each of the first processor and the first display, ii) displaying on the first display a result of the wireless network related processing by the first processor or a result of the non-wireless network related processing by the first processor, and iii) powering down each of the second processor and the second display. The first processor is configured to perform, in accordance with a first power level, both wireless network related processing and non-wireless network related processing.

The method further includes, while the device is operating in the inactive mode, i) powering down each of the first processor and the first display, ii) operating each of the second processor and the second display, and iii) displaying on the second display a result of the wireless network related processing by the second processor. The second processor is configured to perform, in accordance with a second power level, wireless network related processing. The second power level is lower than the first power level.

In other features, a computer according to the present disclosure includes a primary processor, a primary memory, and a primary input/output (I/O) interface that communicates with the primary processor and the primary memory. A primary display communicates with the primary I/O interface. The primary processor, the primary memory, and the primary display are operated in active and inactive modes and are powered down when the computer is in the inactive mode. A secondary processor dissipates less power than the primary processor. A secondary display communicates with the secondary processor. The secondary processor and the secondary display are powered up when the computer is in the inactive mode.

In other features, a secondary memory communicates with the secondary processor, is powered up when the computer is in the inactive mode and has a lower storage capacity than the primary memory. The secondary processor and the secondary display support Personal Digital Assistant-like functions while the computer is in the inactive mode. The computer is a laptop and the secondary display is integrated with an outer surface of the laptop.

In other features, a disk drive system communicates with the primary I/O interface. The secondary processor and the secondary memory are integrated with the disk drive system.

In still other features, a wireless network interface communicates with the primary I/O interface. The secondary processor and the secondary memory are integrated with the wireless network interface. A secondary I/O device communicates with the secondary processor. The secondary display supports touch pad operation. The computer is a desktop computer that includes an enclosure. The secondary display is integrated with the enclosure.

In other features, a system includes the computer and further includes a wireless network interface that communicates with the secondary processor. A distributed communications system communicates with the wireless network interface. A server communicates with the distributed communications system. An agent module is executed by the secondary processor and retrieves at least one of e-mail messages and securities data from the server.

In still other features, a hot zone module is executed by the secondary processor, identifies when the computer is in a hot zone, and provides a visual indication of the hot zone on the secondary display.

A computer according to the present disclosure has active and inactive modes and includes a secondary processor and a secondary display that communicates with the secondary processor. The secondary processor and the secondary display are powered when the computer is in the inactive mode and support Personal Digital Assistant-like functions while the computer is in the inactive mode.

In other features, a secondary memory communicates with the secondary processor and is powered when the computer is in the inactive mode.

Further areas of applicability of the present disclosure will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present disclosure will become more fully understood from the detailed description and the accompanying drawings, wherein:

FIG. 6A illustrates a front view of a desktop computer including an integrated secondary display according to the present disclosure;

FIG. 6B illustrates a front view of a desktop computer including a peripheral secondary display according to the present disclosure.

DETAILED DESCRIPTION

Figure 1:
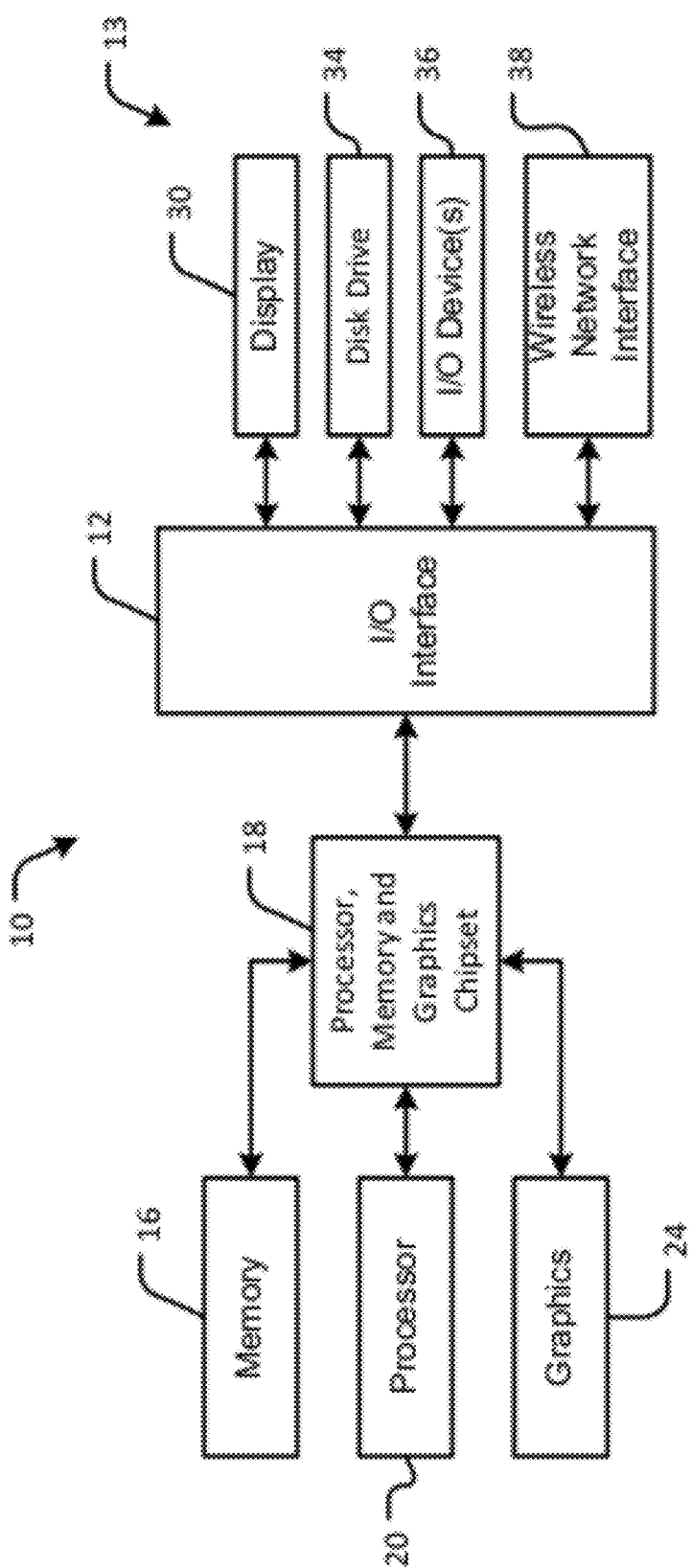
FIG. 1 is a functional block diagram of an exemplary computer architecture for laptop and desktop computers according to the prior art.
Figure 2:
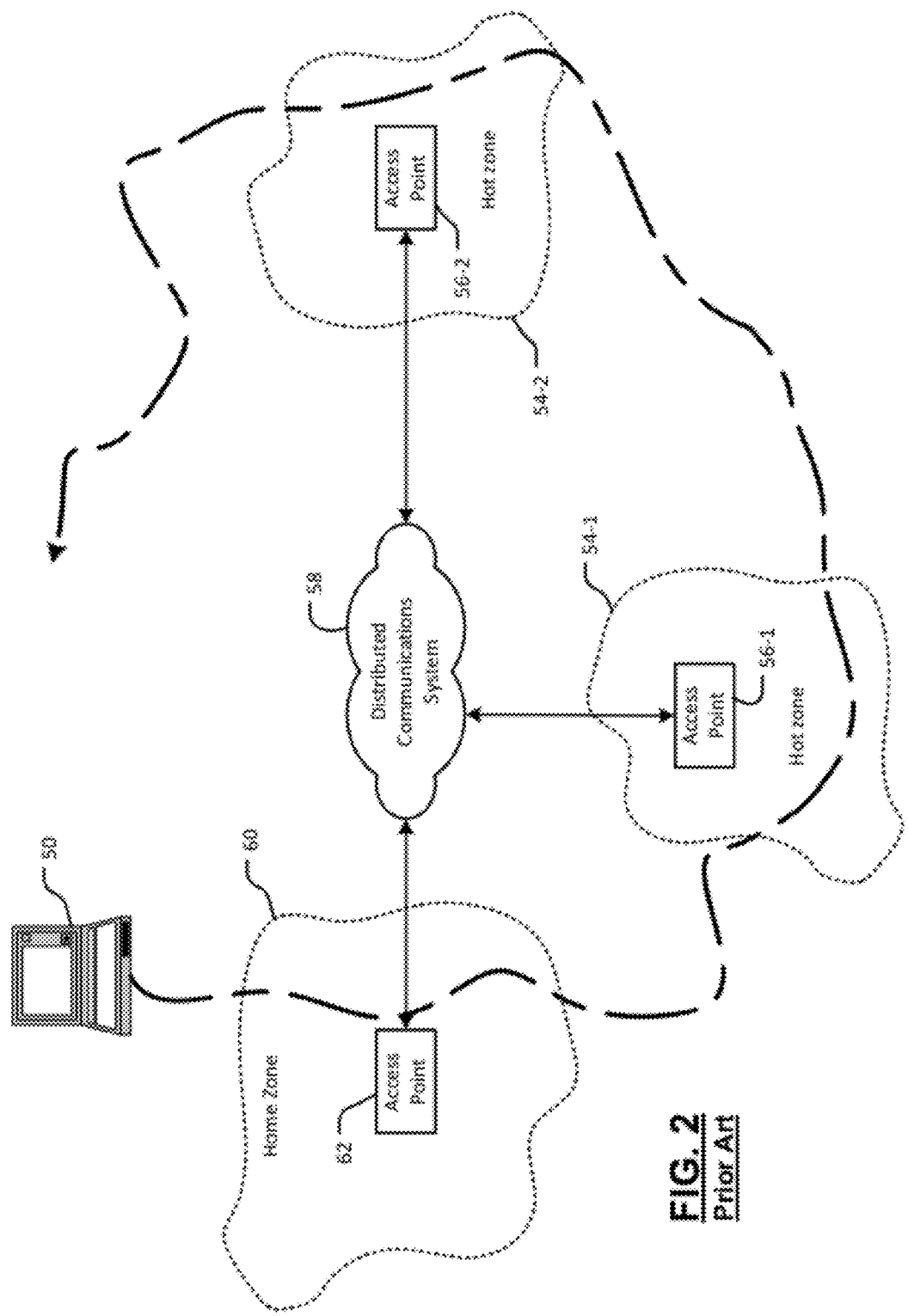
FIG. 2 illustrates a laptop computer as it travels through hot zones according to the prior art.

The following description of the implementation(s) is merely exemplary in nature and is in no way intended to limit the disclosure, its application, or uses. For purposes of clarity, the same reference numerals will be used in the drawings to identify similar elements. As used herein, the term module, agent and/or device refers to an application specific integrated circuit (ASIC), an electronic circuit, a software or firmware program, a processor (shared, dedicated, or group) and memory that execute one or more software or firmware programs, a combinational logic circuit, or other suitable components that provide the described functionality.

The present disclosure provides a novel computer architecture including a low-power secondary processor for operating a secondary display in laptop and desktop computers. The secondary processor dissipates very low power and supports a reduced set of Personal Digital Assistant-like services such as text messaging, e-mail messaging, securities quote retrieval and/or trading, hot zone identification, e-mail notification and the like when the computer is in an inactive mode. The low-power secondary processor and the secondary display are operated when the computer is in the inactive mode. As used herein, the term inactive mode refers to low-power hibernating modes, off modes and/or other modes that do not provide sufficient power to support complex processing and graphics that are normally performed by the primary processor and the primary display of the laptop and desktop computers in the active mode.

Figure 3A:
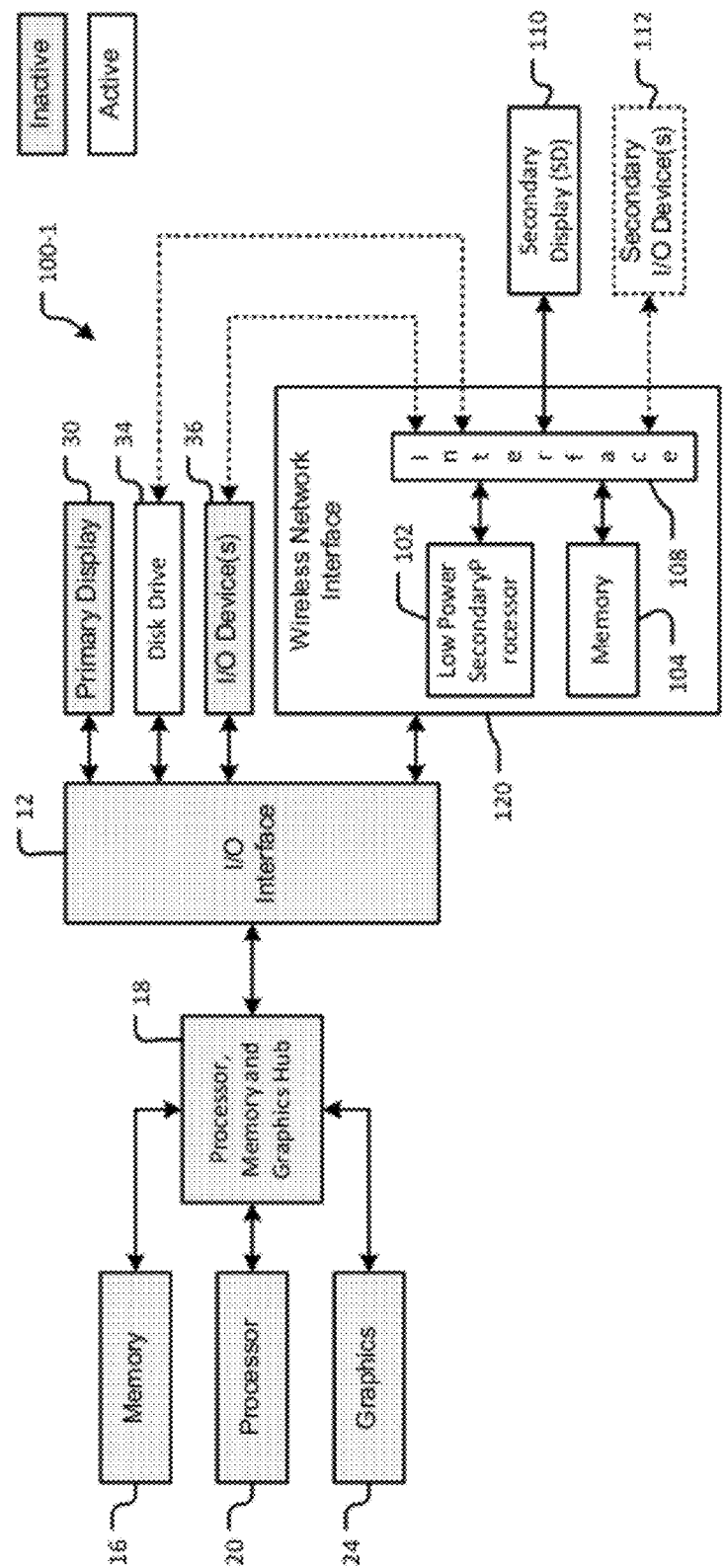
FIG. 3A is a functional block diagram of a first computer architecture for laptop and desktop computers with a secondary processor and a secondary display according to the present disclosure.

Referring now to FIG. 3A, in addition to the primary components described above in conjunction with FIG. 1, a computer architecture 100-1 according to the present disclosure further includes a low-power secondary processor 102 and secondary memory 104. The low-power secondary processor 102 and the secondary memory 104 communicate with a secondary input/output interface 108. The secondary memory 104 includes RAM, ROM, Flash, and/or any other type of electronic data storage. As can be appreciated, some or all of the primary memory 16 can be used instead of and/or in addition to the secondary memory 104.

A secondary display 110 communicates with the I/O interface 108 and supports simple graphics such as the display of text, icons and other low resolution graphics. In an implementation, the secondary display 110 includes a monochrome liquid crystal display (LCD), although a color LCD or other display types may be used. The secondary display 110 may support touch screen functionality. Alternately, one or more secondary input/output devices 112 may be provided such as buttons, touch pads, scratch pads, pointing devices and the like.

In the computer architecture 100-1 that is shown in FIG. 3A, the low-power secondary processor 102, secondary memory 104, and secondary I/O interface 108 are integrated/embedded with a wireless network interface 120. The wireless network interface 120 supports a wireless network such as a wide area network, a local area network, a cellular network such as CDMA, GSM, GSM3G, GPRS systems or other cellular networks, a Bluetooth network, or any other wireless network type. For example, the wireless network interface 38 may be compliant with IEEE Section 802.11, 802.11a, 802.11b, 802.11g, and/or 802.16, which are hereby incorporated by reference in their entirety. In other words, the secondary processor 102 also supports wireless network functionality in addition to the functionality that is described above and that is enabled when the computer is in the inactive mode. Alternatively, the wireless network interface 120 may include another processor that supports wireless network functionality in addition to the secondary processor 102.

Figure 3B:
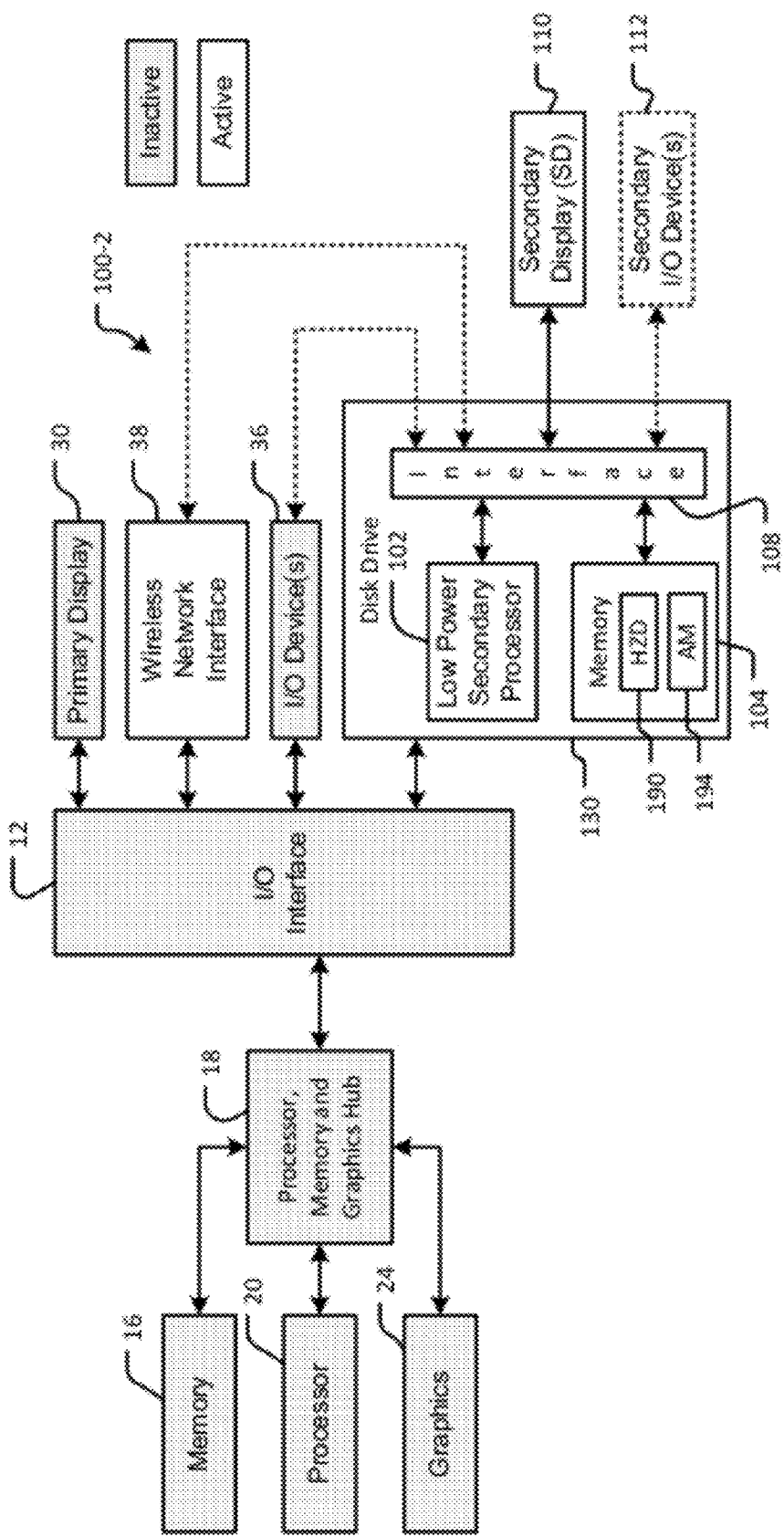
FIG. 3B is a functional block diagram of a second computer architecture for laptop and desktop computers with a secondary processor and a secondary display according to the present disclosure.

In the computer architecture 100-2 that is shown in FIG. 3B, the low-power secondary processor 102, secondary memory 104, and secondary I/O interface 108 are integrated/embedded with a system on chip (SOC) (including a hard disk drive (HDD) and read channel) of a disk drive system 130. In other words, the secondary processor 102 also supports disk drive functionality in addition to other functionality that is described above and that is enabled when the computer is in the inactive mode. Alternatively, the disk drive system 130 may have dedicated processor in addition to the secondary processor 102.

Figure 3C:
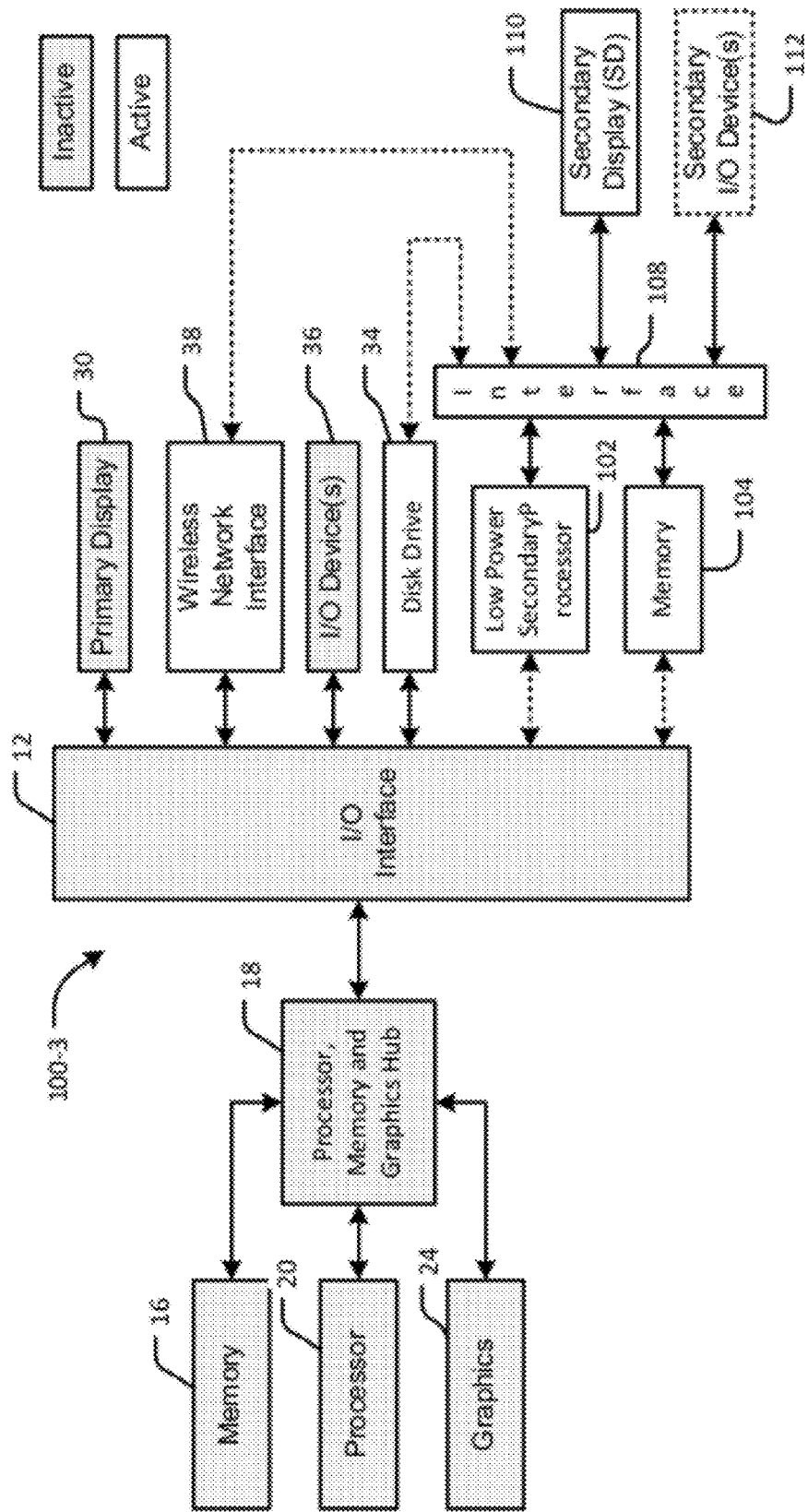
FIG. 3C is a functional block diagram of a third computer architecture for laptop and desktop computers with a secondary processor and a secondary display according to the present disclosure.

In the computer architecture 100-3 that is shown in FIG. 3C, the low-power secondary processor 102, memory 104, and interface 108 are not embedded in or otherwise integrated with other system components.

In the computer architecture 100-1 that is shown in FIG. 3A, the primary memory 16, primary processor 20, graphics 24, hub 18, and primary display 30 are in the inactive mode. The wireless network interface 120, low-power secondary processor 102, secondary memory 104, secondary I/O interface 108, secondary display 110, and secondary I/O devices 112 are powered and support the desired reduced functionality. The I/O interface 12 may be either inactive (as shown) or active. The disk drive system 34 may be powered as needed to store and retrieve data or not powered during the inactive mode. If the disk drive system 34 is not powered during the inactive mode, the secondary memory 104 should have a sufficient size to support the desired reduced functionality.

In the computer architecture 100-2 that is shown in FIG. 3B, the primary memory 16, primary processor 20, graphics 24, hub 18, and primary display 30 are inactive. The wireless network interface 120, low-power secondary processor 102, secondary memory 104, secondary I/O interface 108, secondary display 110, disk drive system 34 and secondary I/O devices 112 are powered and support the desired reduced functionality. The I/O interface 12 may be either inactive (as shown) or active.

In the computer architecture 100-3 that is shown in FIG. 3C, the primary memory 16, primary processor 20, graphics 24, hub 18, and primary display 30 are inactive. The wireless network interface 120, low-power secondary processor 102, secondary memory 104, secondary I/O interface 108, secondary display 110, and secondary I/O devices 112 are powered and support the desired reduced functionality. The I/O interface 12 may be either inactive (as shown) or active. The disk drive system 34 may be powered as needed to store and retrieve data or not powered during the inactive mode. If the disk drive system 34 is not powered during the inactive mode, the secondary memory 104 should have a sufficient size to support the desired reduced functionality.

The low-power secondary processors 102 of the computer architectures 100 have sufficient processing power to drive the secondary displays 110. The secondary processors 102 also handle input and output events via the secondary I/O device(s) 112. The secondary processors 102 also execute hot zone detecting (HZD) modules 190 (for example, shown in FIG. 3B) that sense hot zones and generate an icon, text or other visual message on the secondary display 110 to notify the user of the hot zone.

The secondary processors 102 may also execute agent modules 194 (for example, shown in FIG. 3B) that access and retrieve securities quotes, e-mail, and the like from servers that are associated with the distributed communications system. The agent modules 194 may also generate scrolling banners, icons, text or other visual messages on the secondary display 110 using the information that is retrieved. The user may also use the I/O devices 112 and/or touch pad to perform personal digital assistant-like (PDA-like) tasks such as to retrieve and respond to e-mails, to retrieve securities quotes, to perform securities trades, and/or other similar tasks.

Figure 4A:
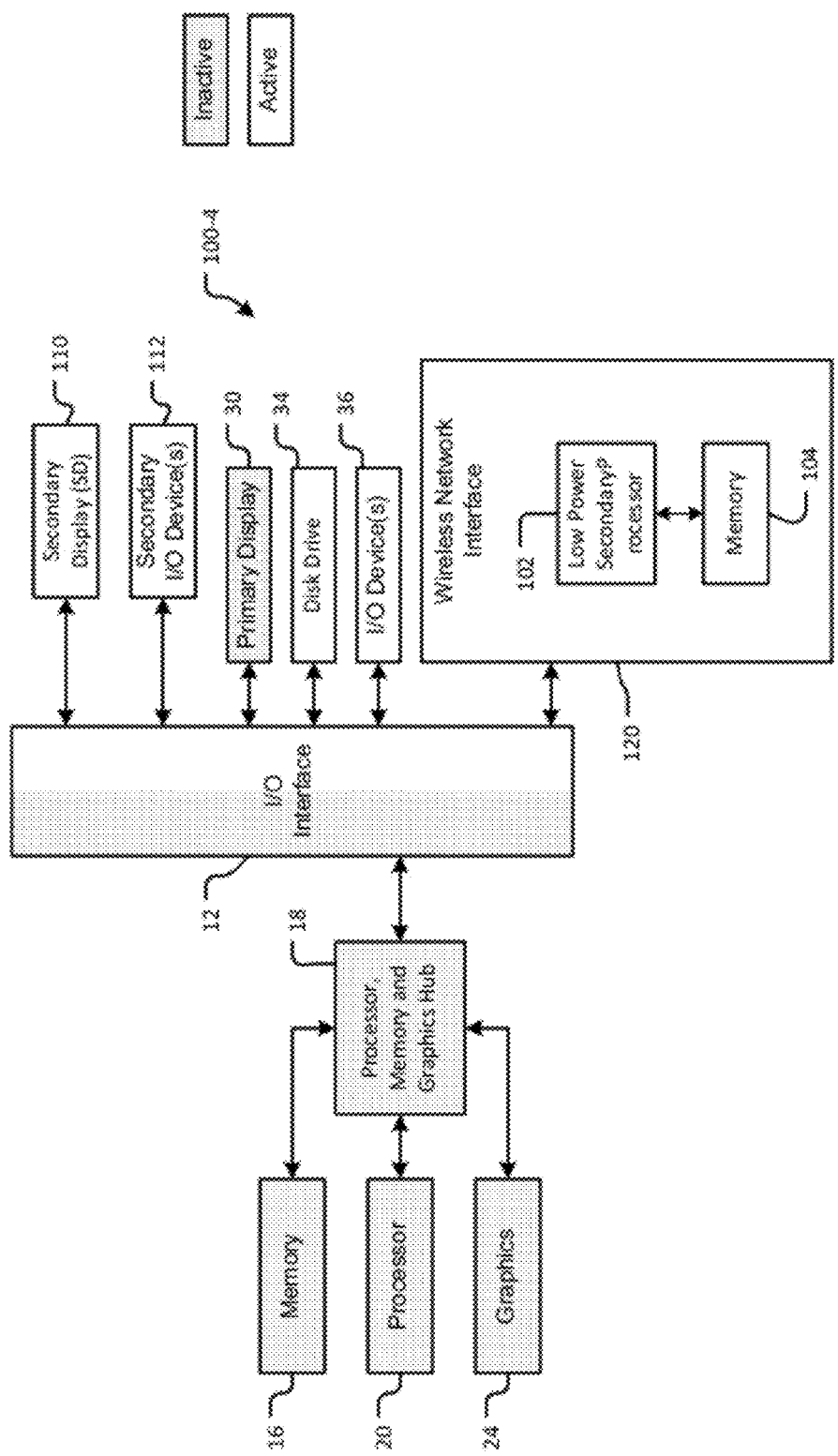
FIG. 4A is a functional block diagram of a fourth computer architecture that is similar to FIG. 3A and that powers the primary I/O interface during the inactive mode according to the present disclosure.

Referring now to FIG. 4A, instead of using a secondary I/O interface 108 as shown in FIG. 3A during the inactive mode, the computer architecture 110-4 employs the primary I/O interface 12 during the inactive mode. When transitioning to the inactive mode, the primary I/O interface 12 remains fully or at least partially powered so that it can support the secondary functions. The secondary display 110 and the secondary I/O devices 112 communicate with the low power secondary processor 102 and memory 104, which are integrated/embedded with the wireless network interface 120, through the primary I/O interface 12. The disk drive 34 and/or the I/O devices 36 may also be powered during the inactive mode and may communicate with the low power secondary processor 102 and memory 104 through the primary I/O interface 12. If the primary I/O devices 36 are powered, the secondary I/O devices 112 may optionally be omitted. For example, a primary keyboard, mouse and/or other primary I/O device may be used for user interaction during the inactive mode.

Figure 4B:
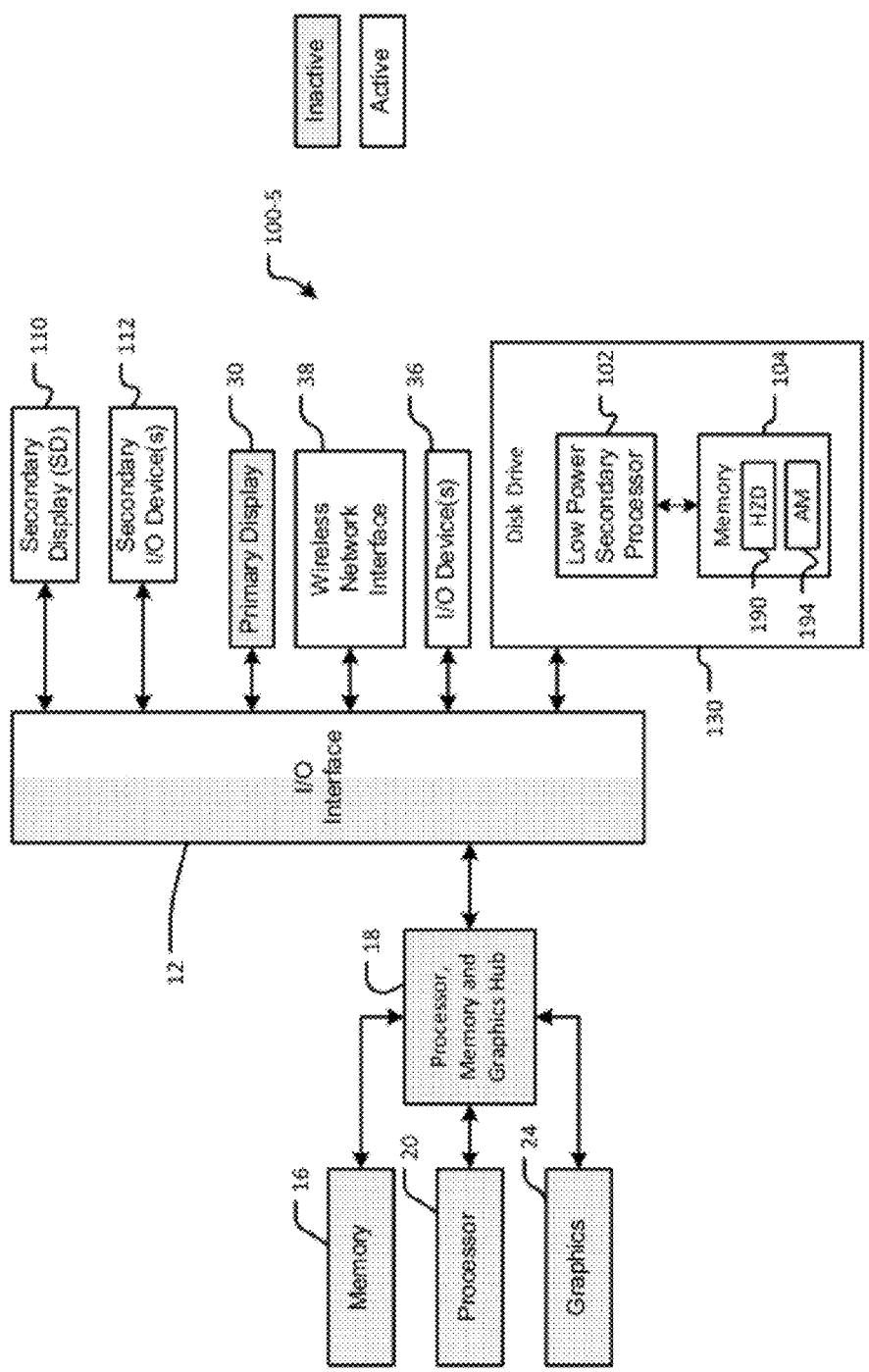
FIG. 4B is a functional block diagram of a fifth computer architecture that is similar to FIG. 3B and that powers the primary I/O interface during the inactive mode according to the present disclosure.

Referring now to FIG. 4B, instead of using a secondary I/O interface 108 as shown in FIG. 3B during the inactive mode, the computer architecture 110-5 employs the primary I/O interface 12 during the inactive mode. When transitioning to the inactive mode, the primary I/O interface 12 remains fully or at least partially powered so that it can support the secondary functions. The secondary display 110 and the secondary I/O devices 112 communicate with the low power secondary processor 102 and memory 104, which are integrated/embedded with the disk drive 130, through the primary I/O interface 12. The wireless network interface 38 and/or the I/O devices 36 may also be powered during the inactive mode and may communicate with the low power secondary processor 102 and memory 104 through the primary I/O interface 12. If the primary I/O devices 36 are powered, the secondary I/O devices 112 may optionally be omitted. For example, the primary keyboard, mouse and/or other primary I/O device may be used for user interaction during the inactive mode.

Figure 4C:
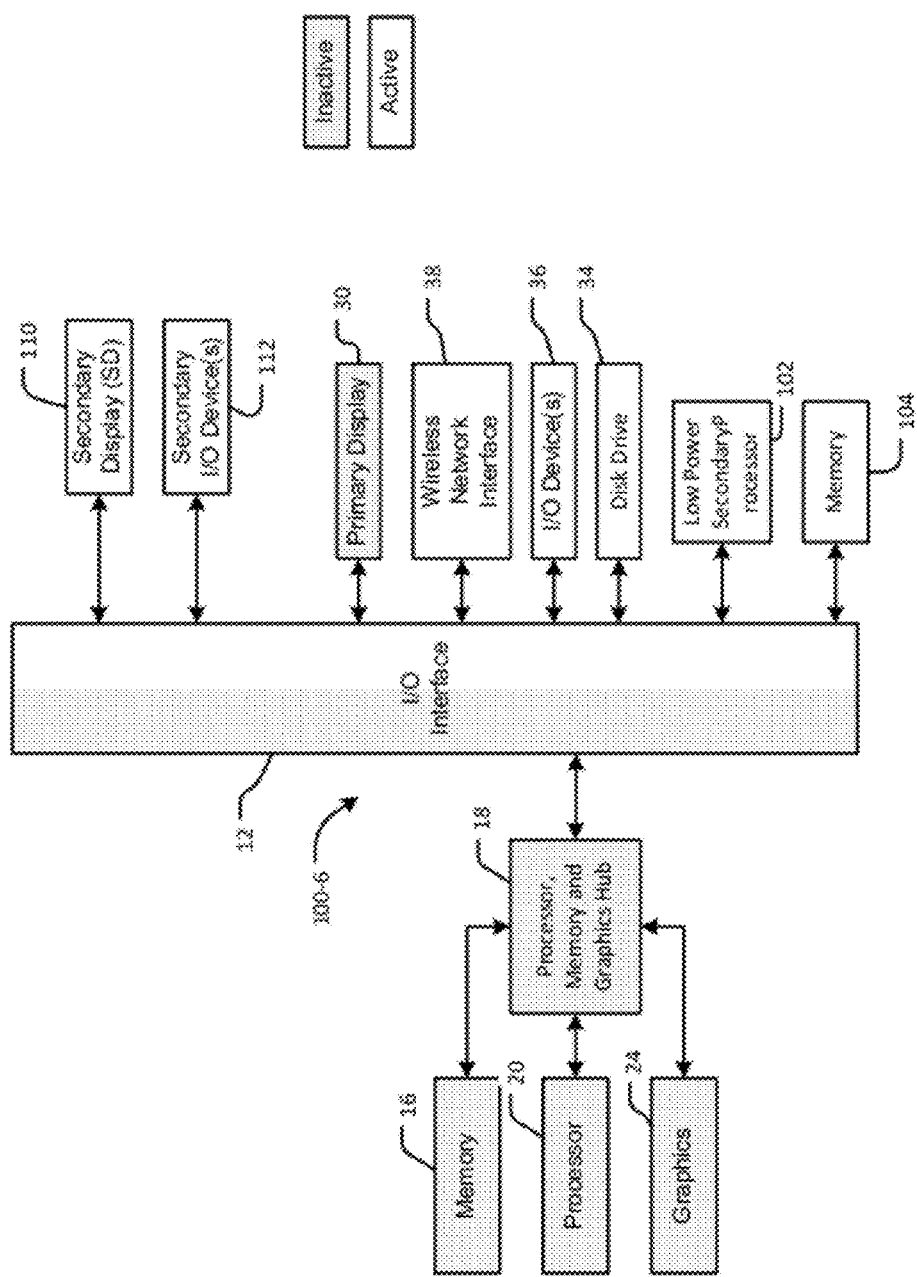
FIG. 4C is a functional block diagram of a sixth computer architecture that is similar to FIG. 3C and that powers the primary I/O interface during the inactive mode according to the present disclosure.

Referring now to FIG. 4C, instead of using a secondary I/O interface 108 as shown in FIG. 3C during the inactive mode, the computer architecture 110-6 employs the primary I/O interface 12 during the inactive mode. When transitioning to the inactive mode, the primary I/O interface 12 remains fully or at least partially powered so that it can support the secondary functions. The secondary display 110 and the secondary I/O device 112 communicate with the low power secondary processor 102 and memory 104 through the primary I/O interface 12. The disk drive 34, the wireless network interface 38 and/or the I/O devices 36 may also be powered during the inactive mode and may communicate with the low power secondary processor 102 and memory 104 through the primary I/O interface 12. If the primary I/O devices 36 are powered, the secondary I/O devices 112 may optionally be omitted. For example, the primary keyboard, mouse and/or other primary I/O device may be used for user interaction during the inactive mode.

Figure 5C:
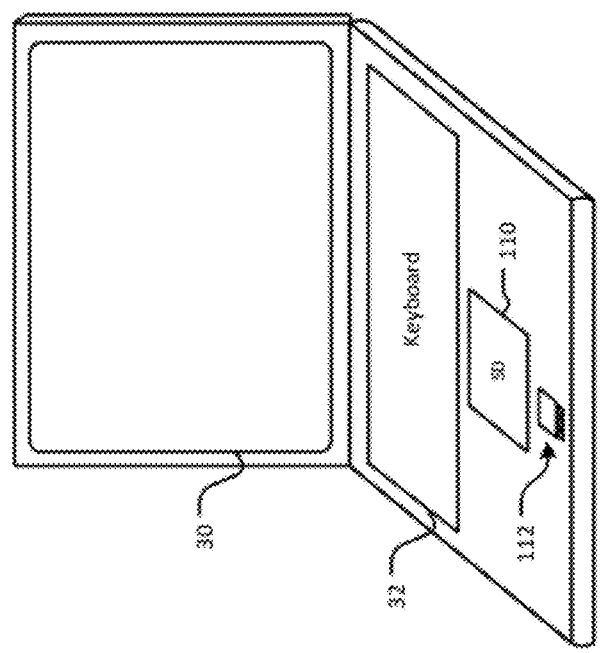
FIG. 5C is a perspective view of a laptop computer including a secondary display mounted inside of the laptop adjacent to the keyboard according to the present disclosure.
Figure 5A:
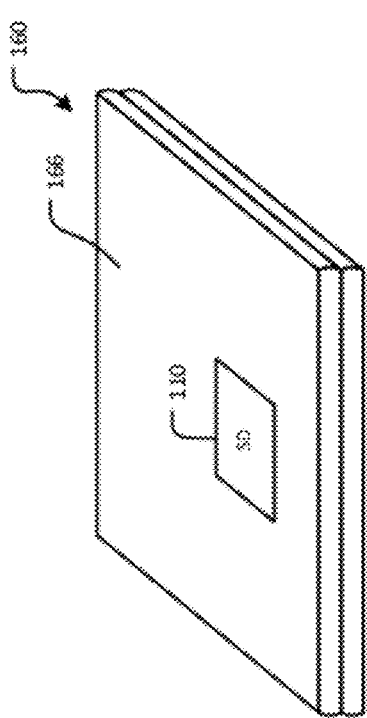
FIG. 5A is a perspective view of a laptop computer including a secondary display according to the present disclosure.
Figure 5B:
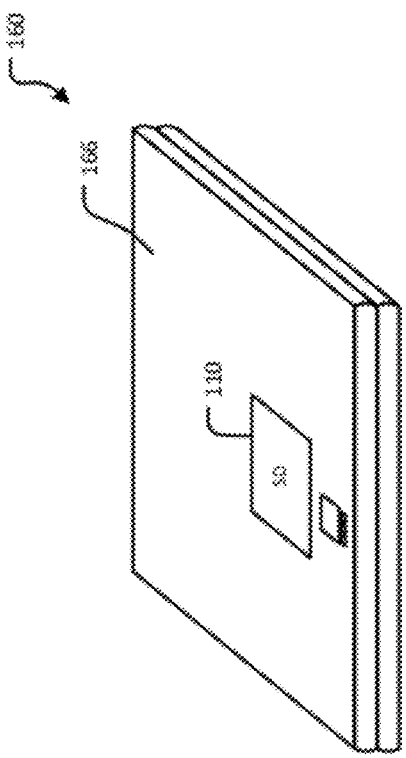
FIG. 5B is a perspective view of a laptop computer including a secondary display and a secondary input/output device according to the present disclosure.

Referring now to FIGS. 5A, 5B and 5C, a laptop computer 160 according to the present disclosure includes the secondary display 110. For example, the secondary display 110 can be arranged on a top side 166 of the laptop computer 160. Skilled artisans will appreciate that the secondary display 110 may be located in many other locations on the laptop 160 including, but not limited to, the front edges, inside of the laptop adjacent to the keyboard, or in any other suitable location. Referring now to FIG. 5B, secondary I/O devices 170 may be provided such as but not limited to buttons, a scratch pad, a pointing device, a keyboard, a mini key pad, an alphanumeric key pad similar to a telephone and/or other devices. The secondary I/O devices 170 are located adjacent to the secondary display 110. In FIG. 5C, the secondary display 110 is located adjacent to the keyboard on the inside of the laptop. Still other locations will be readily apparent.

Referring now to FIGS. 6A and 6B, a desktop computer 200 includes the secondary display 110, which can be integrated with a computer enclosure 204 as shown. Skilled artisans will appreciate that there are a variety of other suitable locations on the enclosure 204, the keyboard (or other I/O device) and/or the monitor 206 for the secondary display 110. In FIG. 6B, the secondary display 110 is connected as a peripheral device to the desktop computer 200. The secondary display 110 can also be connected to a laptop computer as a peripheral device as well. In this implementation, the low power secondary processor 102, the secondary memory 104 and/or the secondary I/O interface 108 may also be associated with the peripheral secondary display 110.

Figure 7:
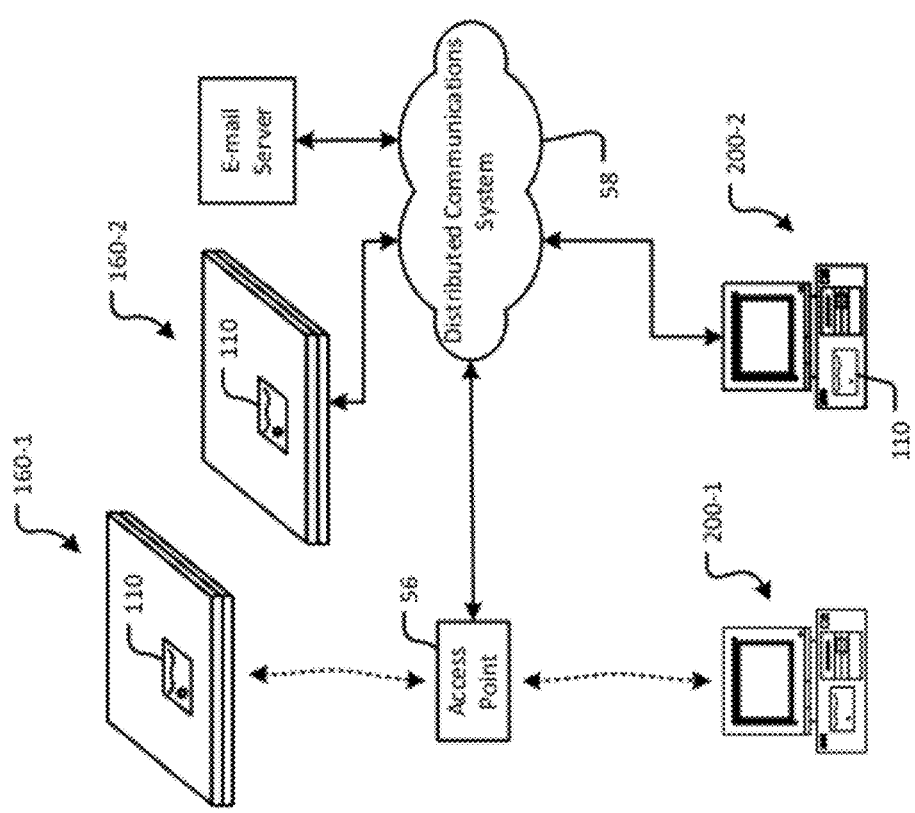
FIG. 7 illustrates laptop and desktop computers with secondary displays that are directly and/or wirelessly connected to a distributed communication system and a server.

Referring now to FIG. 7, the secondary processors 102 and secondary displays 110 that are associated with the laptop and desktop computers can be operated in a network, for example, wirelessly via the access point 56 and/or directly connected to the distributed communications system 58. The secondary processors 102 and secondary displays 110 provide the reduced set of services without requiring the laptop or desktop computer to be booted up.

The secondary display and other components that are operated when the primary components are inactive may be powered by the battery that powers the laptop and/or via a secondary battery (not shown). In one implementation, the secondary battery is recharged by the main battery during the active mode.

Those skilled in the art can now appreciate from the foregoing description that the broad teachings of the present disclosure can be implemented in a variety of forms. Therefore, while the implementations have been described in connection with particular examples thereof, the true scope of the implementations should not be so limited since other modifications will become apparent to the skilled practitioner upon a study of the drawings, the specification and the following claims.

What is claimed is:

1. A device operable in each of an active mode and an inactive mode, the device comprising:
    a first processor configured to perform, in accordance with a first power level, both wireless network related processing and non-wireless network related processing;
    a second processor configured to perform wireless network related processing in accordance with a second power level, wherein the second power level is lower than the first power level;
    a first display in communication with the first processor; and
    a second display in communication with the second processor,
    wherein while the device is operating in the active mode,
        i) each of the first processor and the first display is powered up,
        ii) the first display is configured to display a result of the wireless network related processing by the first processor or a result of the non-wireless network related processing by the first processor, and
        ii) each of the second processor and the second display is powered down, and
    wherein while the device is operating in the inactive mode,
        i) each of the first processor and the first display is powered down,
        ii) each of the second processor and the second display is powered up, and
        iii) the second display is configured to display a result of the wireless network related processing by the second processor.

2. The device of claim 1, further comprising a wireless network interface,
    wherein each of the first processor and the second processor is configured to transmit and receive wireless network data through the wireless network interface.

3. The device of claim 2, wherein:
    the second processor is integrated with the wireless network interface on a system on a chip; and
    the second display is in communication with the second processor via the wireless network interface.

4. The device of claim 1, further comprising a disk drive system, wherein:
    the second processor is integrated with the disk drive system; and
    the second display is in communication with the second processor via the disk drive system.

5. The device of claim 1, further comprising:
    a first memory in communication with the first processor, wherein the first memory is i) powered up while the device is operating in the active mode, and ii) powered down while the device is operating in the inactive mode; and
    a second memory in communication with the second processor, wherein the second memory is powered up while the device is operating in the inactive mode, and wherein the second memory has a lower storage capacity than the first memory.

6. The device of claim 1, wherein:
the second processor is configured to detect a hot zone while the device is operating in the inactive mode; and
the second display is configured to display information identifying the hot zone while the device is operating in the inactive mode.

7. The device of claim 1, wherein the second processor is configured to support one or more of text messaging, e-mail delivery, and securities quote retrieval while the device is operating in the inactive mode.

8. The device of claim 1, further comprising:
a first battery configured to power the first processor and the first display; and
a second battery configured to power the second processor and the second display.

9. The device of claim 8, wherein the first battery is configured to charge the second battery while the device is operating in the active mode.

10. The device of claim 1, further comprising:
a first input/output (I/O) device in communication with the first processor, wherein the first I/O device is powered down while the device is operating in the inactive mode; and
a second I/O device in communication with the second processor, wherein the second I/O device is powered up while the device is operating in the inactive mode.

11. The device of claim 1, wherein the device is a laptop.

12. A method of operating a device in an active mode and an inactive mode, wherein the device includes i) a first processor, ii) a second processor, iii) a first display in communication with the first processor, and iv) a second display in communication with the second processor, the method comprising:
while the device is operating in the active mode
i) operating each of the first processor and the first display, wherein the first processor is configured to perform, in accordance with a first power level, both wireless network related processing and non-wireless network related processing,
ii) displaying on the first display a result of the wireless network related processing by the first processor or a result of the non-wireless network related processing by the first processor, and
iii) powering down each of the second processor and the second display, and
while the device is operating in the inactive mode
i) powering down each of the first processor and the first display,
ii) operating each of the second processor and the second display, wherein the second processor is configured to perform, in accordance with a second power level, wireless network related processing, and wherein the second power level is lower than the first power level, and
iii) displaying on the second display a result of the wireless network related processing by the second processor.

13. The method of claim 12, further comprising transmitting and receiving wireless network data via a wireless network interface:
using the first processor while the device is the active mode; and
using the second processor while the device is in the inactive mode.

14. The method of claim 12, further comprising:
powering up a first memory in communication with the first processor while the device is operating in the active mode;
powering down the first memory while the device is operating in the inactive mode; and
powering up a second memory in communication with the second processor while the device is operating in the inactive mode, wherein the second memory has a lower storage capacity than the first memory.

15. The method of claim 12, further comprising:
detecting a hot zone via the second processor while the device is operating in the inactive mode; and
displaying information via the second display identifying the hot zone while the device is operating in the inactive mode.

16. The method of claim 12, further comprising supporting at least one of text messaging, e-mail delivery, and securities quote retrieval via the second processor while the device is operating in the inactive mode.

17. The method of claim 12, further comprising:
powering the first processor and the first display using a first battery; and
powering the second processor and the second display using a second battery.

18. The method of claim 17, further comprising charging the second battery using the first battery while the device is operating in the active mode.

19. The method of claim 12, further comprising:
powering down a first input/output (I/O) device in communication with the first processor while the device is operating in the inactive mode; and
powering up a second I/O device in communication with the second processor while the device is operating in the inactive mode.

* * * * *